United States Patent [19]
Deed et al.

[11] Patent Number: 5,121,305
[45] Date of Patent: Jun. 9, 1992

[54] WHEEL LIGHT

[76] Inventors: John Deed, 1816 S. Bamdal St., Santa Ana, Calif. 92704; Humberto E. Pelascini, deceased, late of Redlands; by Humberto E. Pelascini, Jr. executor, 1076 Brookside Ave., #107, Redlands, both of Calif. 92373

[21] Appl. No.: 680,841

[22] Filed: Apr. 5, 1991

[51] Int. Cl.⁵ ................................................. B62J 6/00
[52] U.S. Cl. ........................................ 362/72; 362/78; 362/216; 362/193; 362/800
[58] Field of Search .................... 362/72, 78, 216, 217, 362/800, 220, 193, 396; 340/432

[56] References Cited

U.S. PATENT DOCUMENTS

| | | | |
|---|---|---|---|
| 4,135,229 | 1/1979 | Modurkay | 362/78 |
| 4,607,317 | 8/1986 | Lin | 362/216 |
| 4,763,230 | 8/1988 | Cummings et al. | 362/72 |
| 4,999,753 | 3/1991 | MacKenzie | 362/800 |

*Primary Examiner*—James C. Yeung
*Attorney, Agent, or Firm*—Michael R. Collins

[57] ABSTRACT

A device which provides a source of light for a wheeled vehicle such as a bicycle to provide warning of the presence of the vehicle and any person or rider. The device uses a battery power pack which may be rechargeable that mounts around the axle of a wheel of the vehicle. A string of light emitting diodes contained in a clear sealed flexible tube is electrically connected to the power pack. The power pack and tube rotate with the wheel and provide an active light source for others to see such as drivers of automobiles. The device is especially useful on spoke wheels such as bicycles.

8 Claims, 3 Drawing Sheets

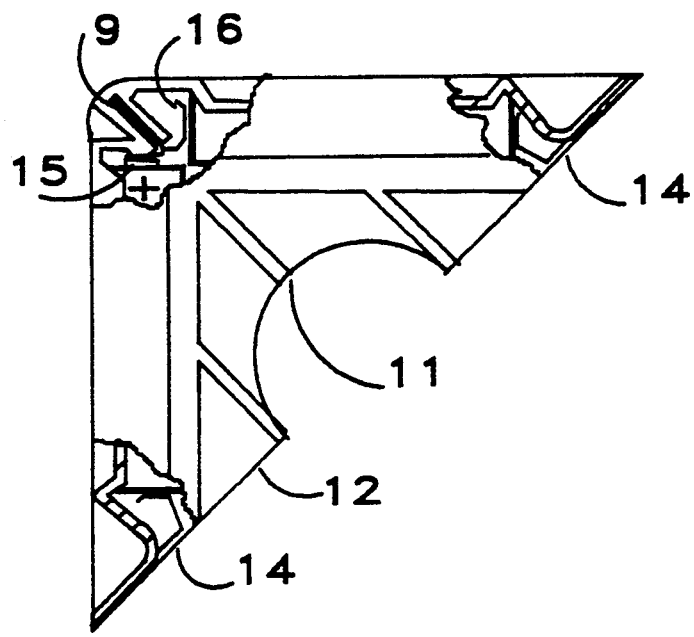
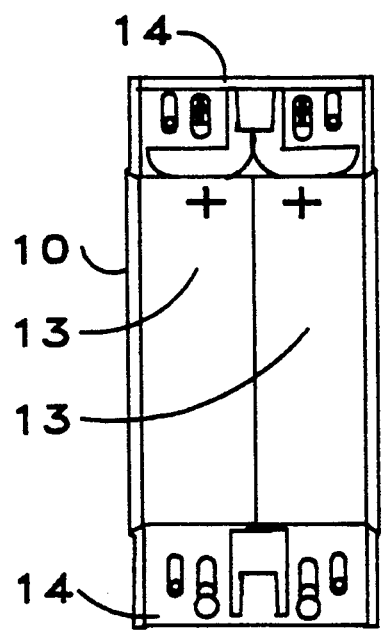
FIG.5A  FIG.5B
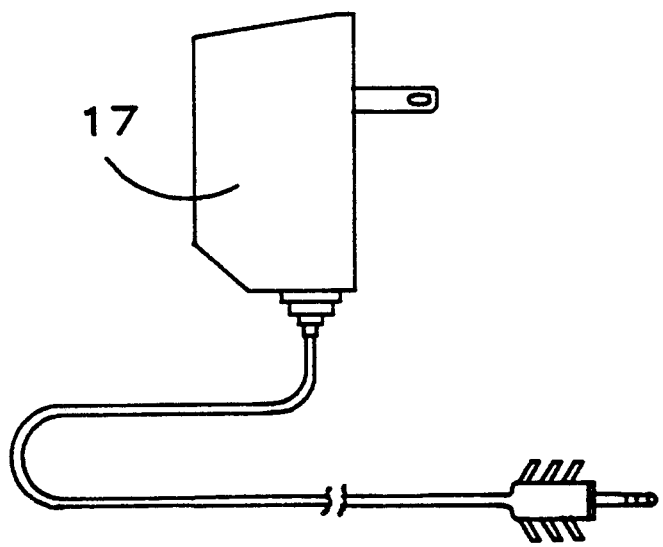
FIG.6

WHEEL LIGHT

FIELD OF THE INVENTION

This invention relates to devices used to provide safety during darkened hours for persons using wheeled vehicles such as bicycles. The new device provides an illumination that is visible to give notice that the vehicle is present.

DESCRIPTION OF RELATED ART

There are currently in use means to attempt to warn others such as automobile drivers of the presence of a person on another vehicle such as a bicycle, scooter, etc. Some of the devices include reflectors of various colors which reflect incident light, battery and generator powered tail lights and head lamps, lights and reflectors on helmets or clothing worn by the rider, and tape strips which glow in incident light.

The present invention combines the use of a power pack using batteries with light emitting diode (LED) devices to provide a highly visible light source. The LED devices are contained in a flexible, transparent sleeve for ease in mounting in various configurations. This flexibility allows convenient use in wheeled vehicles with spoke wheels.

SUMMARY OF THE INVENTION

A primary objective of the present invention is to provide safety for persons using wheeled vehicles such as bicycles. By providing a simple light that can be mounted in various configurations such as in the spokes of a bicycle, the vehicle is more visible during hours of darkness.

A further object of the invention is to provide this light source for a reasonable period of time such that the wheeled vehicle can be used for many hours of darkness without recharging the battery.

In accordance with the description presented herein other objects of this invention will become apparent when the description and drawings are reviewed.

BRIEF DESCRIPTION OF THE DRAWINGS

FIGS. 5A and 5B illustrates the power pack.

FIG. 6 illustrates the battery charger.

DESCRIPTION OF THE PREFERRED EMBODIMENT

Figure 1:
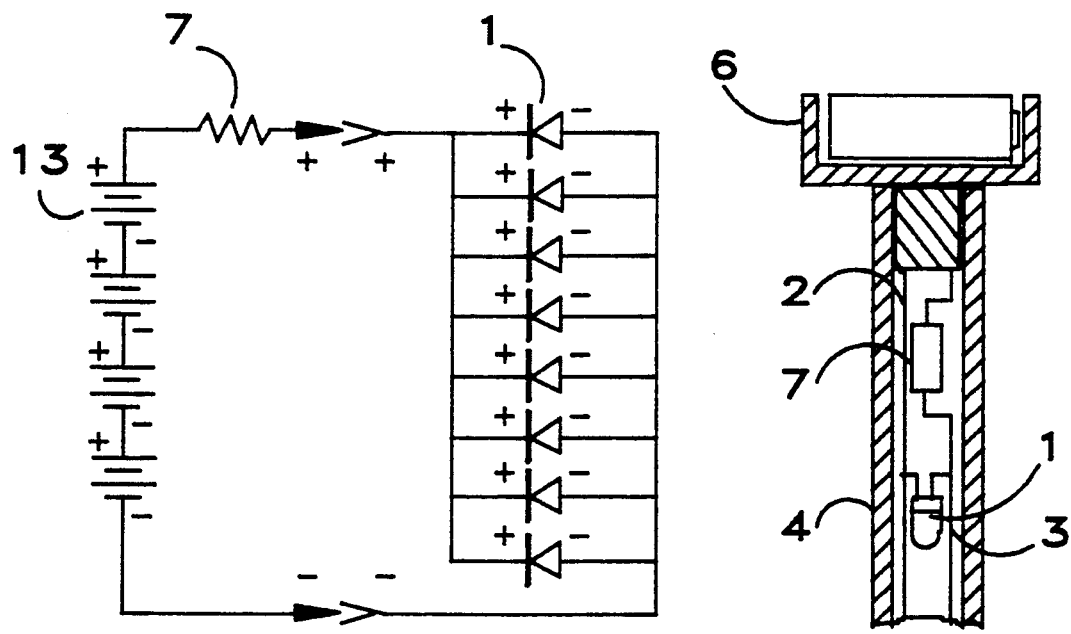
FIG. 1 illustrates a schematic of the electrical function.

The wheel light consists of a light source contained in a flexible, transparent sleeve or tube. The light source is electrically connected to a power pack which can be axially mounted on the rotating axle of a wheel. The power pack also has a means for a battery charger to be electrically connected to allow recharge of the power pack batteries. The wheel light is shown schematically in FIG. 1. With the batteries properly charged, the LED provides illumination through the transparent tube in the color of the LED selected.

Figure 2:
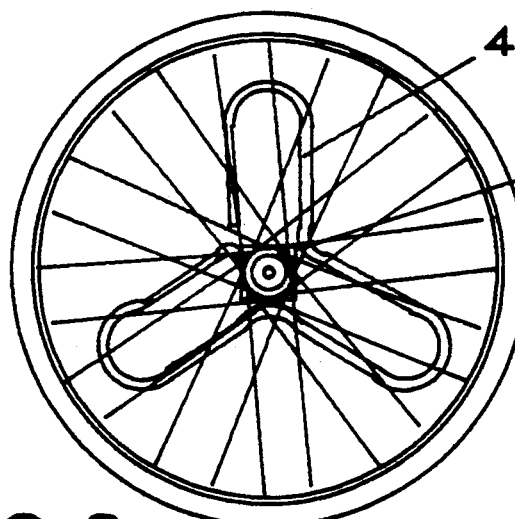
FIG. 2 illustrates the light source and power pack mounted on a spoked wheel.
Figure 4:
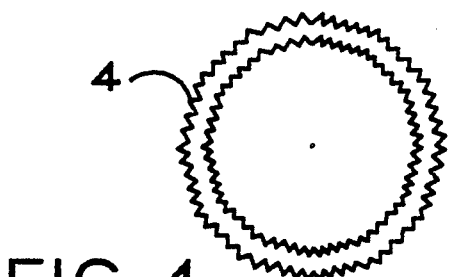
FIG. 4 illustrates a cross section of the tube with grooves.
Figure 3:
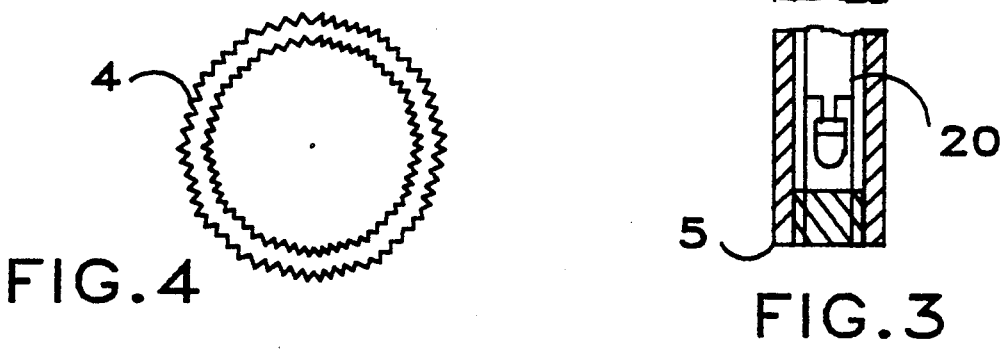
FIG. 3 illustrates the light source with flexible, transparent sleeve and LED contained therein.

Referring to FIGS. 2 through 4, a string of eight LED (1) are connected electrically in parallel by anode wire (2) and cathode wire (3) and are contained in tube (4). The tube (4) is sealed by a cap (5) in one end and a connector (6) in the opposite end. A tie down (20) holds the end of the LED string to the cap (5). A tube (4) of 5 feet in length has been found the most suitable for spoked wheels of bicycles. The tube (4) is an extruded flexible polyvinyl chloride (PVC), clear with clear ultraviolet inhibiter added and grooved longitudinally to provide maximum light illumination as shown in the tube (4) cross section in FIG. 4.

The anode wire (2) has a series resistor (7) of 20 ohms to limit current to the LED from the power pack (8). The connector (6) is designed to fit firmly in the end of the tube (4) and provide contact area for the anode wire (2) and cathode wire (3) to electrically connect to the power pack (8) via connector plug (9).

Referring to FIGS. 5A and 5B, the power pack (8) is comprised of two similar triangular shaped housings (10). The housing (10) has a semicircular recess (11) in the mount (12) to allow it to fit around the axle of a wheel. The housing (10) is designed to hold a maximum of four AA size batteries (13). The preferred method is to use rechargeable batteries (13) for convenience rather than having to constantly replace them. Electrical connection between batteries (13) and the connector plug (9) is by means of contacts (14), plug contact (15) and corner contact (16). One of the two housings (10) is molded with the connector plug (9) hole filled such that the power pack when assembled has only one connector plug (9).

Referring to FIG. 6, a typical battery charger (17) converting 120 volts to 9.5 volts may be connected to the power pack (8) at connecter plug (9) to allow recharging of the batteries (13).

Figure 7:
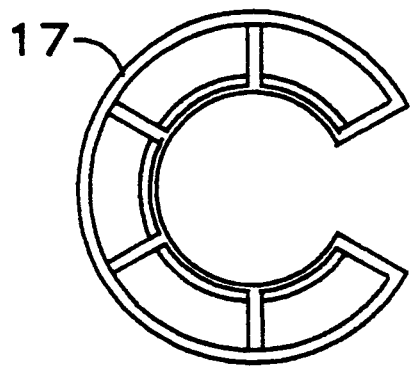
FIG. 7 illustrates the adapter.
Figure 8A:
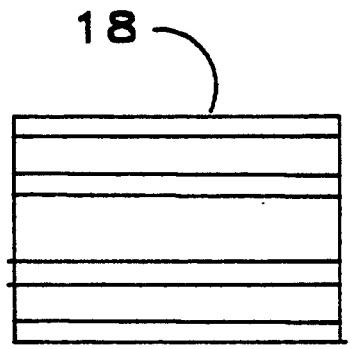
FIGS. 8A and 8B illustrates the spacer.
Figure 8B:
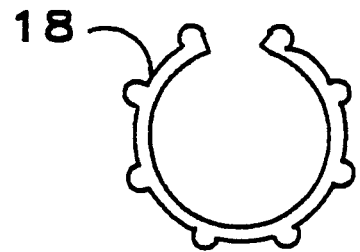

Referring to FIGS. 7 and 8A and 8B, an adapter (17) and spacer (18) may be used to accommodate various diameter wheel axles to assure a firm fit of the power pack (8). This prevents the power pack (8) when mounted from slipping relative to the axle and pulling on the tube (4). The power pack (8) and tube (4) rotate as one unit relative to the wheel and axle of the vehicle.

Figure 9A:
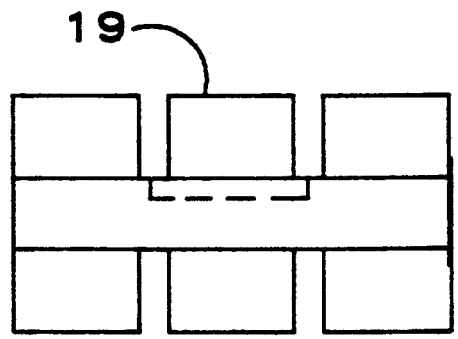
FIGS. 9A and 9B illustrates a light source retaining clip.
Figure 9B:
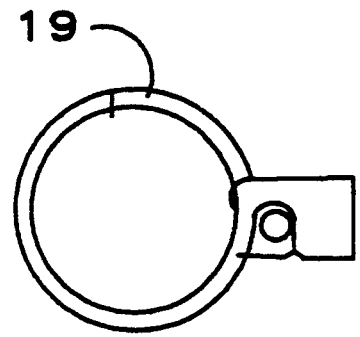

Referring to FIGS. 9A and 9B, retaining clips (19) are used to attach the tube (4) to the spokes of a wheel.

Referring again to FIG. 1, the power pack (8) can use 4 or 8 batteries (13) where 4 each are connected in series to provide 4.8 to 6.0 volt output with 500 milliampere hour service between charges. In the two 4 series battery configuration, 8 batteries (13), up to 8 hours of use between charges may be obtained. The wires and clips connecting batteries (13) and diodes (1) must be of sufficient size to carry 200 milliamperes with a maximum temperature rise of 10 degrees Fahrenheit. The batteries (13) are AA size rechargeable Ni-Cad. The nominal current of the string of LED diodes is 160 milliamperes and nominal voltage of 5 volts.

I claim:

1. An apparatus for illuminating a wheeled vehicle comprising:

a. a plurality of light emitting diodes connected electrically in parallel and contained in a flexible, transparent tube which is sealed at one end by a cap and an electrical connector at the opposite end;

b. the tube being of sufficient length to be attached to wheeled vehicles such as a bicycle wheel spoke;

c. the electrical connector is connected to a connector plug in a power pack which has two similar triangular shaped housings which may be attached by an attachment means around the axle of a bicycle wheel and make electrical contact between them wherein the housing has a mount with a semicircular recess of sufficient diameter to fit firmly around the axle; and d. the housing having recesses to hold suitable size and power batteries which are electrically connected by means of a plurality of contacts and which are electrically connected to the connector plug for connection to the electrical connector.

2. The apparatus as in claim 1 wherein the tube is an extruded flexible polyvinyl chloride (PVC), clear with clear ultraviolet inhibitor added and grooved longitudinally.

3. The apparatus as in claim 1 wherein the electrical connector is formed of one piece plastic with ribbed protrusions on one end to fit snugly in the tube and seal the tube and the other end of the electrical connector providing two contacts for connection to the power pack.

4. The apparatus as in claim 1 wherein batteries are of the rechargeable Ni-Cad type.

5. The apparatus as in claim 1 wherein an adapter may be used with the mount to fit firmly around smaller diameter axles.

6. The adapter as in claim 5 wherein a spacer may be used with the adapter for smaller diameter axles.

7. The apparatus as in claim 1 wherein a battery charger converting 120 volts AC to 9.5 volts DC may be connected to the connector plug.

8. The apparatus as in claim 1 wherein the tube is connected to a spoke of a bicycle wheel by a clip which retains the spoke and tube by the clip comprising one piece with a plastic hinge between three "S" shaped arms with the "S" shape arm having a size on one end sufficient to fit around a bicycle spoke and the other end sufficient to fit around the tube and the middle "S" shaped arm is opposedly mounted relative to the two outside "S" shaped arms is retained by the hinge such that when closed the insertion of the tube in the circular hole thereby formed prevents the two "S" shaped arms from opening.

* * * * *